United States Patent
Bahuguna et al.

(10) Patent No.: US 7,555,177 B1
(45) Date of Patent: Jun. 30, 2009

(54) ALL FIBER MAGNETO-OPTIC ON-OFF SWITCH FOR NETWORKING APPLICATIONS

(75) Inventors: Rashmi Bahuguna, Ames, IA (US); Mani Mina, Ames, IA (US); Robert J. Weber, Boone, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 2 days.

(21) Appl. No.: 11/733,855

(22) Filed: Apr. 11, 2007

Related U.S. Application Data (60) Provisional application No. 60/791,276, filed on Apr. 12, 2006.

(51) Int. Cl.
G02B 6/26 (2006.01)
(52) U.S. Cl. ................... 385/16; 385/1; 385/23
(58) Field of Classification Search .............. None
See application file for complete search history.

(56) References Cited

U.S. PATENT DOCUMENTS

| | | | | |
|---|---|---|---|---|
| 4,702,557 A | * | 10/1987 | Beckmann et al. | 349/197 |
| 4,859,013 A | * | 8/1989 | Schmitt et al. | 385/6 |
| 4,978,189 A | * | 12/1990 | Blonder et al. | 385/35 |
| 5,056,885 A | * | 10/1991 | Chinn | 385/13 |
| 5,400,418 A | * | 3/1995 | Pearson et al. | 385/11 |
| 5,905,823 A | * | 5/1999 | Shintaku et al. | 385/11 |
| 2004/0190107 A1 | * | 9/2004 | Hiironen et al. | 359/280 |

OTHER PUBLICATIONS

H. Yokoi et al. Optical nonreciprocal devices with a silicon guiding layer fabricated by wafer bonding. Applied Optics, 42:33:6605-6612, Nov. 2003.*
H. Dötsch et al. Applications of magneto-optical waveguides in integrated optics: review. J. Opt. Soc. Am. B, 22:1:240-253, Jan. 2005.*

(Continued)

Primary Examiner—Sung H Pak
Assistant Examiner—Mike Stahl
(74) Attorney, Agent, or Firm—Reinhart Boerner Van Deuren P.C.

(57) ABSTRACT

A fiber optic switch based on the magneto-optic effect of magnetic materials is presented. Due to the optical fiber based construction of the switching device it is suitable for optical fiber networks The on-off function of the switch is useful for isolation and connection of node(s) from a fiber optical network without having to turn off a laser. The switch is based on the Faraday Effect exhibited by magneto-optic materials. The all-fiber magneto-optic switch has a beam splitter at the input that splits an incoming signal into orthogonal polarized paths. Each path has at least one magneto-optic Faraday rotator (MOFR) controlled by a field. When the field is present, the polarization of the optical beam changes, thereby turning the switch on or off depending on the initial polarization of the beam. A beam coupler couples the orthogonal polarized paths at the output of the all-fiber magneto-optic switch. The MOFR is a bismuth substituted iron garnet. In an alternate embodiment the switch is constructed in the Mach-Zehnder configuration, utilizing two 3 dB couplers, isolators and MOFRs. In an alternate embodiment the switch is fabricated on silicon-on-insulator.

19 Claims, 12 Drawing Sheets

OTHER PUBLICATIONS

Y. Shoji et al. Wideband design of nonreciprocal phase shift magneto-optical isolators using phase adjustment in Mach-Zehnder interferometers. Applied Optics, 45:27:7144-7150, Sep. 2006.*

Yuri S. Didosyan, Han Hauser, and Georg A. Reider, Magnetooptic Switch Based on Domain Wall Motion In Orthoferrites, paper published in a journal, Sep. 2002, 3 pages, IEEE Transactions on Magnetics, vol. 38, No. 5.

Tsutomu Aoyama, Taketoshi Hibiya, and Yoshinori Ohta, A New Faraday Rotator Using a Thick Gd;YIG Film Grown by Liquid-Phase Epitaxy and Its Applications to an Optical Isolator and Optical Switch, paper published in a journal, Mar. 1983, 6 pages, Journal of Lightwave Technology, vol. LT-1, No. 1.

Masataka Shirasaki et al., Magnetooptical 2×2 switch for single-mode fibers, paper, Oct. 1, 1984, 6 pages, pp. 3271-3276, Applied Optics, vol. 23, No. 19.

Rashmi Bahuguna et al., Magneto-Optic-Based Fiber Switch for Optical Communications, paper, Oct. 2006, 3 pages, pp. 3099-3101, IEEE Transactions on Magnetics, vol. 42, No. 10.

Rashmi Bahuguna et al., Mach-Zehnder Interferometric Switch Utilizing Faraday Rotation, paper, Jun. 2007, 3 pages, pp. 2680-2682, IEEE Transactions on Magnetics, vol. 43, No. 6.

Rashmi Bahuguna et al., A Novel All Fiber Magneto-optic On-off Switch, paper, 2005, 7 pages, pp. 590702-1-590702-7, Proc. of SPIE vol. 5907, 590702.

Rashmi Bahuguna, Investigation of Magneto-optical Properties for Optical Fiber Based Devices, dissertation, 2007, 82 pages.

* cited by examiner

ALL FIBER MAGNETO-OPTIC ON-OFF SWITCH FOR NETWORKING APPLICATIONS

CROSS-REFERENCE TO RELATED PATENT APPLICATIONS

This patent application claims the benefit of U.S. Provisional Patent Application No. 60/791,276, filed Apr. 12, 2006, the entire disclosure of which is incorporated by reference in its entirety herein.

STATEMENT REGARDING FEDERALLY SPONSORED RESEARCH AND DEVELOPMENT

This invention was made in part with Government support under Grant Number NSF CNS-0306007-REU awarded by the National Science Foundation. The Government has certain rights in this invention.

FIELD OF THE INVENTION

This invention pertains to networking, and more particularly to network optic switching devices.

BACKGROUND

The growth of the Internet and multi-media applications for digital components such as cell-phones, personal digital assistants (PDAs), computers, and the like has resulted in an ever increasing demand for bandwidth. Along with the growth, the infrastructure needed to handle the increase in bandwidth to support the growth has also increased. Fiber based networks have been deployed to meet the need for the increasing bandwidth demands. Communication networks that are fiber based networks have the capability of making or breaking signal paths depending on the demands of the nodes in the network. Fast switching is therefore needed in order to fully exploit the available bandwidth of the fiber.

Different switching technologies have been developed with the aim of achieving fast and reliable switching. For example, optical micromechanical systems (MEMS) switching based on silicon technology, thermal optical switching, electro-optic switching, and acousto-optic switching are the technologies that have been implemented. Drawbacks exist with each type of switch for e.g. MEMS switches and thermo optic switches have switching times of the order of milliseconds, which is slow for a 10 Gb/s LAN communication network, thermo optic switches have a high insertion loss of about 8 dB. Electro-optic switches are considerably faster with switching times in nanoseconds but suffer from high insertion losses of about 9 dB. Acousto-optic switches have switching times in the order of microseconds and an insertion loss of about 6 dB.

Further development of switching technologies is needed to fully use the bandwidth of high-speed fiber networks and other networks.

BRIEF SUMMARY

An all fiber based magneto-optic on-off switch is provided. The switch is used to connect or disconnect a transmitter from a fiber network as required instead of turning the transmitter on and off electronically. With electronic control, the typical semiconductor lasers can take about 300 μs to turn on hence slowing down the system and losing data.

The all-fiber magneto-optic switch has a polarization beam splitter at the input that splits an incoming signal into orthogonal polarized paths. In each path is at least one magneto-optic Faraday rotator that is controlled by a field. When the field is present, the Faraday rotator changes the state of polarization of the incident optical beam, thereby turning the switch on or off depending on the initial polarization of the beam. A polarization beam coupler couples the orthogonal polarized paths at the output of the all-fiber magneto-optic switch.

The magneto-optic Faraday rotator in both embodiments is a bismuth substituted iron garnet.

In one embodiment, the all-fiber magneto-optic switch is configured as a Mach-Zehnder interferometric switch.

BRIEF DESCRIPTION

The accompanying drawings incorporated in and forming a part of the specification illustrate several aspects of the present invention and, together with the description, serve to explain the principles of the invention. In the drawings.

DETAILED DESCRIPTION

The invention provides an all fiber based magneto-optic on-off switch. The advantages of a fiber construction are simple and economic design, no need of alignment of the free space components and therefore ease of deployment in a network where needed. The switch is used to connect or disconnect a transmitter from the fiber network as required instead of turning the transmitter on and off electronically. The interaction of light with a magnetic material involves the electronic structure of the material and is affected by the magnetic state of the material. This gives rise to magnetooptical effects such as Faraday, Kerr and Voigt effects.

The Faraday Effect is the rotation of the polarization of light as it travels through a magnetic material in the presence of a magnetic field. Longitudinal Faraday Effect (i.e. the rotation of polarization when the applied field is in the same direction as the path of the light) is quite large for optics grade rare earth doped iron garnets. A linearly polarized light can be considered as a superposition of left and right circularly polarized light (LCP and RCP). Application of an external magnetic field changes the magnetic state of the material and as a result the LCP and the RCP light see a different refractive index for the material. This is also known as magnetic circular dichroism. Thus the angle of polarization of the incoming linearly polarized light is rotated by an angle that can be written as, $$\theta = F \times l \times M \quad (1)$$

where F is a constant, l is the path length of light in the magneto-optic material and M is the magnetization of the material. The Faraday rotation measured over the whole surface of the sample is different from that measured for a microscopic area on the surface due to the averaging effects of the randomly oriented magnetizations of the domains.

Bismuth doped rare earth iron garnets have a large magneto-optic figure of merit (i.e. the ratio of the Faraday rotation and the optical absorption in the optical communications wavelength window). Improved thick film ferrimagnetic bismuth-substituted rare-earth iron garnets, 330 µm thick and 1.5 mm square, obtained from Integrated Photonics Inc., are used as the Faraday rotators in one embodiment of the switch. The material had Terbium (Tb) and Gallium (Ga) doping for low temperature dependence and low saturation magnetic field necessary to operate the Faraday rotator in the single domain configuration. Macroscopically, a rotation of 45 degrees is obtained at an applied field equal to the saturation field of 350 Oe.

Figure 1A:
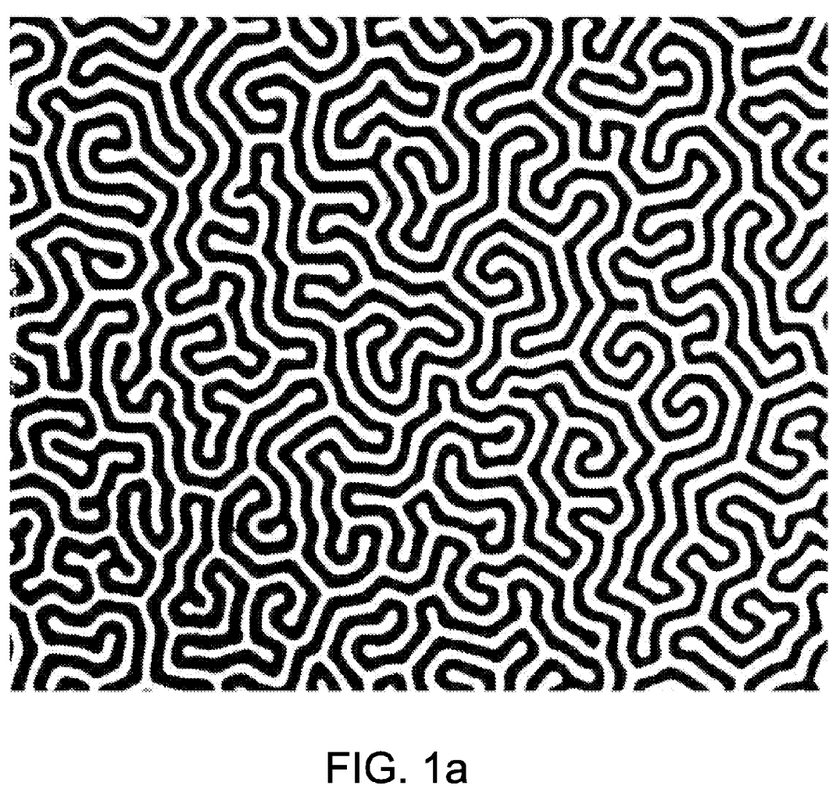
FIG. 1a is an illustration of magnetic domains in a demagnetized standard thick film Faraday rotator with perpendicular anisotropy.
Figure 1B:
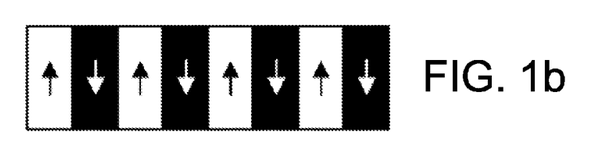
FIG. 1b is a schematic of the lateral view of demagnetized periodic stripe domains.
Figure 1C:
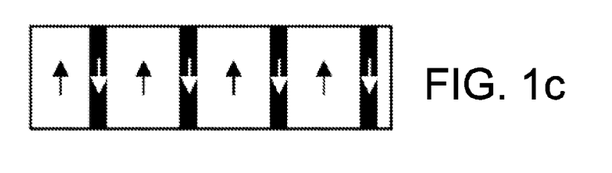
FIG. 1c is a schematic of the lateral view of partially magnetized periodic stripe domains with a field below the saturating field applied to the "up" domains.
Figure 1D:
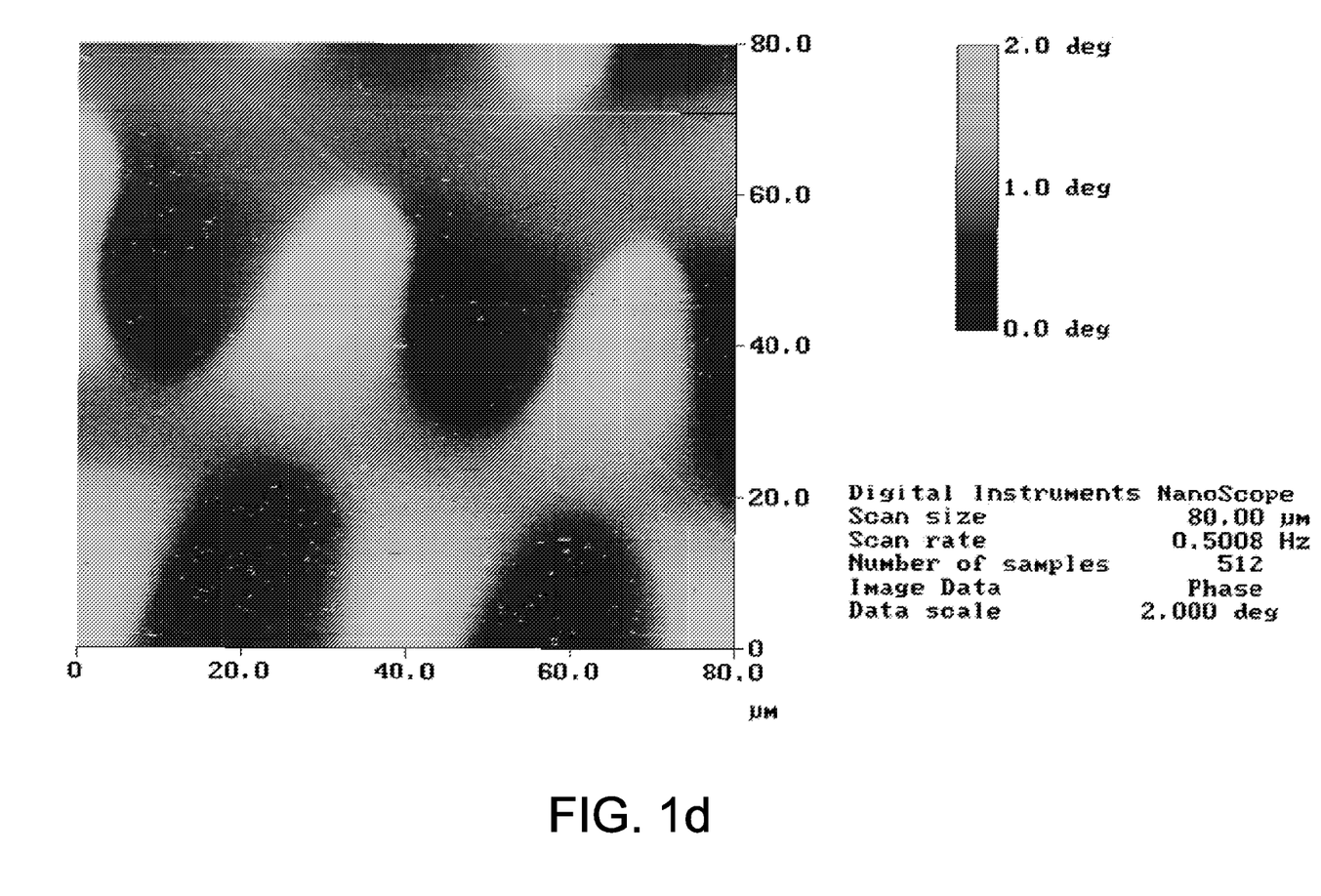
FIG. 1d is a magnetic force microscope view of a demagnetized sample of the actual thick film Faraday rotator that was used in the experimental setup.

A magnetic force microscope was used to image the domain structure of the samples as shown in FIG. 1d. The size of the domains was measured to be about 20 µm. The schematic of the orientation of the domains of a demagnetized sample is shown in FIG. 1b. When an external field in the direction of the "up" domains is applied those domains grow at the expense of the oppositely oriented domains as shown in FIG. 1c. The effect of the growth of the favorably oriented domains is the change in the angle of polarization of the optical signal.

Figure 2:
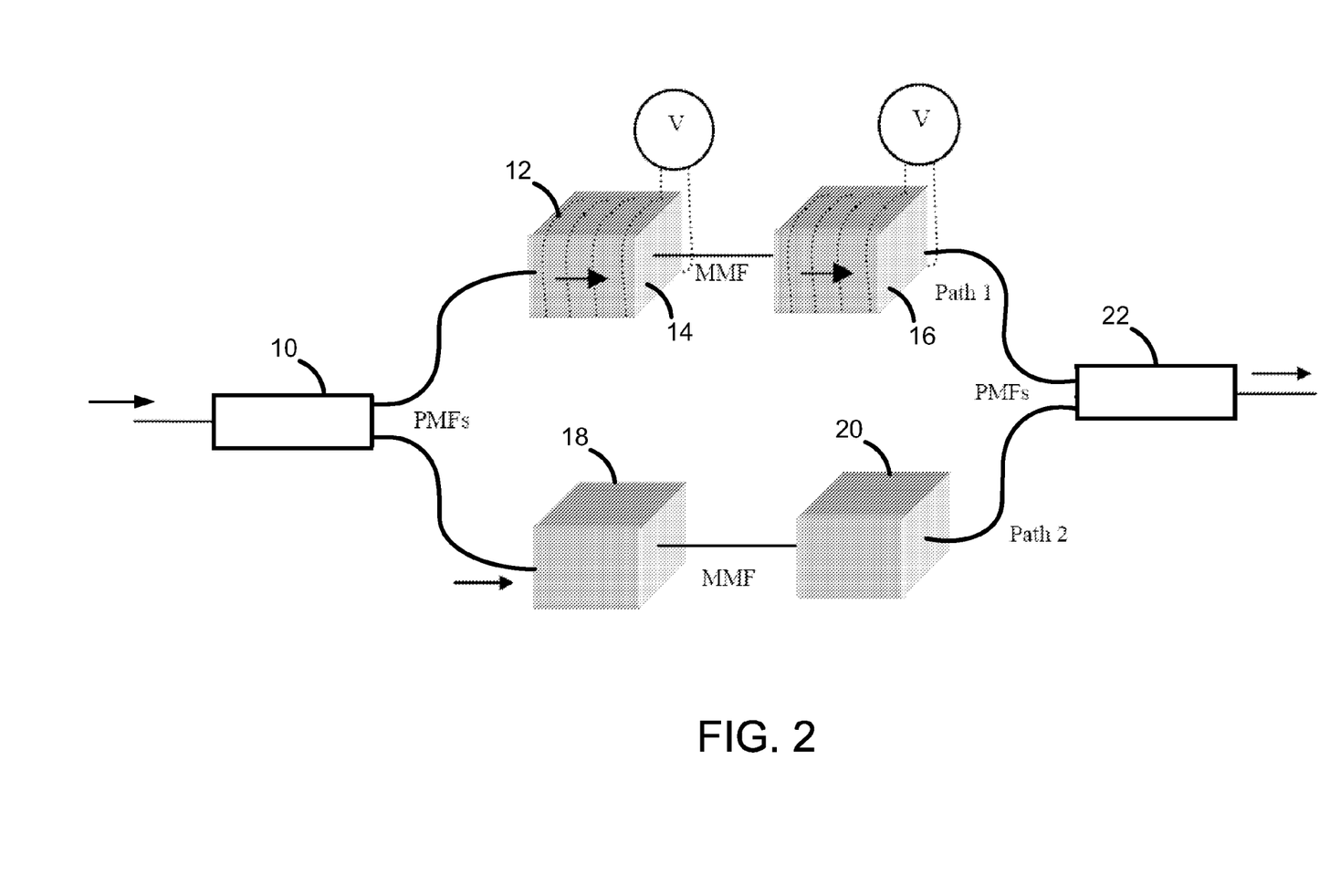
FIG. 2 is a schematic view of a switch setup in accordance with the teachings of the invention.
Figure 3:
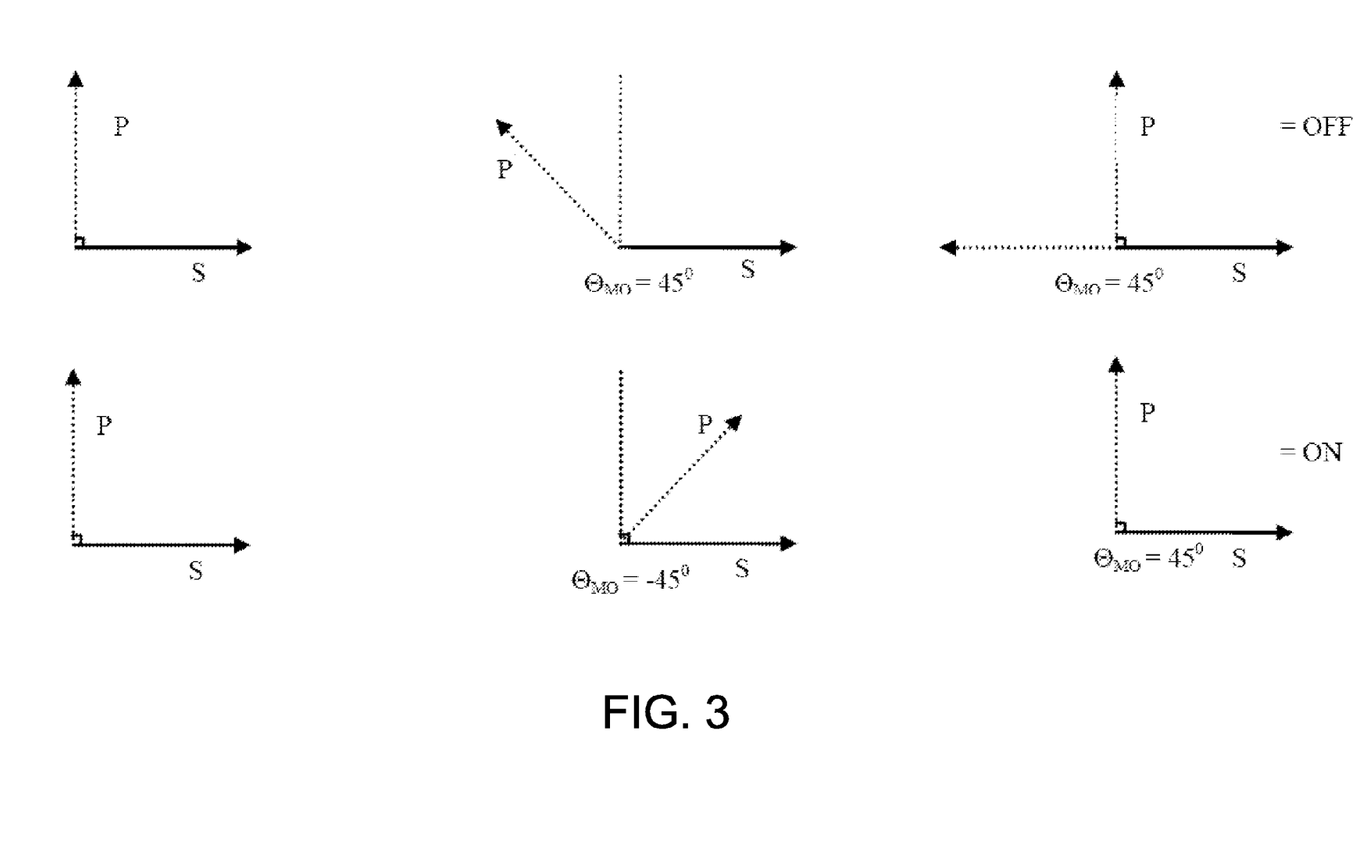
FIG. 3 is a vector representation of the On and Off operation of the switch of FIG. 2.

Turning now to FIGS. 2 and 3, the switch design and principle of operation are shown. The input signal is split into mutually perpendicular P and S polarizations by the polarization beam splitter (PBS) 10, which traverse paths 1 and 2 respectively. A current carrying coil 12, such as, for example, a current carrying solenoid, wound about the magneto-optic samples 14, 16 provides the bias magnetic field. The magnetic field is parallel to the direction of propagation of the light beam. Changing the direction of current in the coil changes the sign of the Faraday rotation. The magneto-optic sample 14 in path 1 rotates the P polarization by forty-five degrees (45°) as shown in FIG. 3. The second magneto-optic sample 16 rotates it further by (45°) making the P polarization rotate a total of ninety degrees (90°). The total field cancels out as shown in FIG. 3(a) and the switch is turned off (i.e. no light is transmitted to the output fiber).

To turn the switch on, the biasing magnetic field across the magneto-optic sample 14 is reversed and the P polarization is therefore rotated by −45° as shown in FIG. 3b. The second magneto-optic sample 16 rotates the polarization by +45° making the total rotation equal to zero. The two orthogonal polarizations are combined by the polarization beam combiner (PBC) 22 and light is transmitted to the output fiber. The powers of the signals in both the paths should be almost the same in order to cancel the fields and obtain a good extinction ratio. This is ensured by making the two paths identical by placing two magneto-optic samples 18, 20 without any applied magnetic field in path 2.

The change in polarization due to the magneto-optic sample can be expressed with the Jones transformation matrix, $$J(l) = e^{-j(\frac{2\pi}{\lambda}) l n_{MO}} \begin{pmatrix} \cos(Fl) & -\sin(Fl) \\ \sin(Fl) & \cos(Fl) \end{pmatrix} \quad (2)$$

where l is the thickness of the material, $n_{MO}$ is the refractive index of the magneto-optic material, and F is the Faraday rotation per unit length. Taking into account the reflection losses at the boundaries of two different media, the field before the PBC in path 1 for an off state is $$E_{1,off} = \{T_{MO_2} J_2(l) T_{MO_2}\}\{T_{MO_1} J_{1,off}(l) T_{MO_1}\}\{T_{PBS} S_{PBS} T_{PBS}\} \begin{pmatrix} E_p \\ 0 \end{pmatrix} \quad (3)$$

and for an on state is $$E_{1,on} = \{T_{MO_2} J_2(l) T_{MO_2}\}\{T_{MO_1} J_{1,on}(l) T_{MO_1}\}\{T_{PBS} S_{PBS} T_{PBS}\} \begin{pmatrix} E_p \\ 0 \end{pmatrix} \quad (4)$$

The field in path 2 is $$E_2 = \{T_{MO_2} J_2(l) T_{MO_2}\}\{T_{MO_1} J_{1,on}(l) T_{MO_1}\}\{T_{PBS} S_{PBS} T_{PBS}\} \begin{pmatrix} 0 \\ E_s \end{pmatrix} \quad (5)$$

where $T_{PBS}$ and $T_{PBS}$ are the transmission matrices at the interface of the SMF (single mode fiber at the input) and the PBS and the PBS and the outgoing PMF (polarization maintaining fiber), given by the following equations, $$T_{PBS} = \begin{pmatrix} \frac{2n_{PBS}}{n_{SMF} + n_{PBS}} & 0 \\ 0 & \frac{2n_{PBS}}{n_{SMF} + n_{PBS}} \end{pmatrix}, \quad (6)$$

$$T_{PBS} = \begin{pmatrix} \frac{2n_{PMF}}{n_{PMF} + n_{PBS}} & 0 \\ 0 & \frac{2n_{PMF}}{n_{PMF} + n_{PBS}} \end{pmatrix}$$

and $S_{PBS}$ is the splitting ratio matrix for the PBS, it is assumed to be 1:1 for analysis hence $$S_{PBS} = \begin{pmatrix} 1/\sqrt{2} & 0 \\ 0 & 1/\sqrt{2} \end{pmatrix} \quad (7)$$

The Jones matrices for the polarization rotation of ±45 degrees by the first magneto-optic material in the off and on state is given as, $$J_{1,off} = J_2(l) = e^{-j(\frac{2\pi}{\lambda})ln_{MO}} \begin{pmatrix} \frac{1}{\sqrt{2}} & -\frac{1}{\sqrt{2}} \\ \frac{1}{\sqrt{2}} & \frac{1}{\sqrt{2}} \end{pmatrix}, \quad (8)$$

$$J_{1on} = e^{-j\frac{2\pi}{\lambda}ln_{MO}} \begin{pmatrix} \frac{1}{\sqrt{2}} & \frac{1}{\sqrt{2}} \\ -\frac{1}{\sqrt{2}} & \frac{1}{2} \end{pmatrix}$$

where the subscript denotes the first or second magneto-optic material. The transmission matrices at the interface of the PMF and the second magneto-optic sample and the second sample and the PMF are:

$$T_{MO_2} = T_{MO_1} = \begin{pmatrix} \frac{2n_{PMF}}{n_{PMF} + n_{MO}} & 0 \\ 0 & \frac{2n_{PMF}}{n_{PMF} + n_{MO}} \end{pmatrix}, \quad (9)$$

$$T_{MO_2} = T_{MO_1} = \begin{pmatrix} \frac{2n_{MO}}{n_{PMF} + n_{MO}} & 0 \\ 0 & \frac{2n_{MO}}{n_{PMF} + n_{MO}} \end{pmatrix}$$

Analysis of the switch shows that a 180° difference between the polarizations in the two paths is needed for the switch to operate in the off state. This confirms the intuitive explanation in FIG. 3.

Figure 4A:
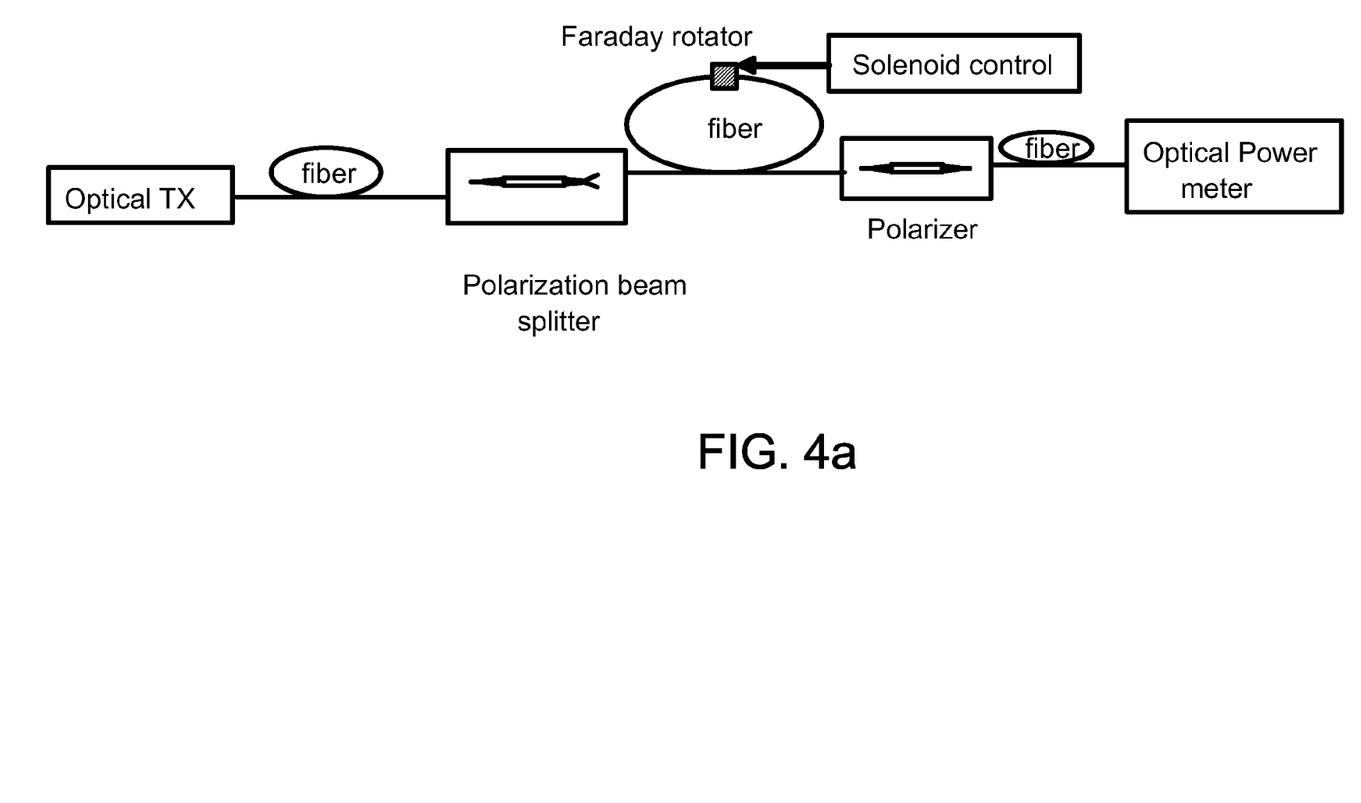
FIG. 4a is a schematic view of the setup to measure Faraday rotation of the Faraday rotator.
Figure 4B:
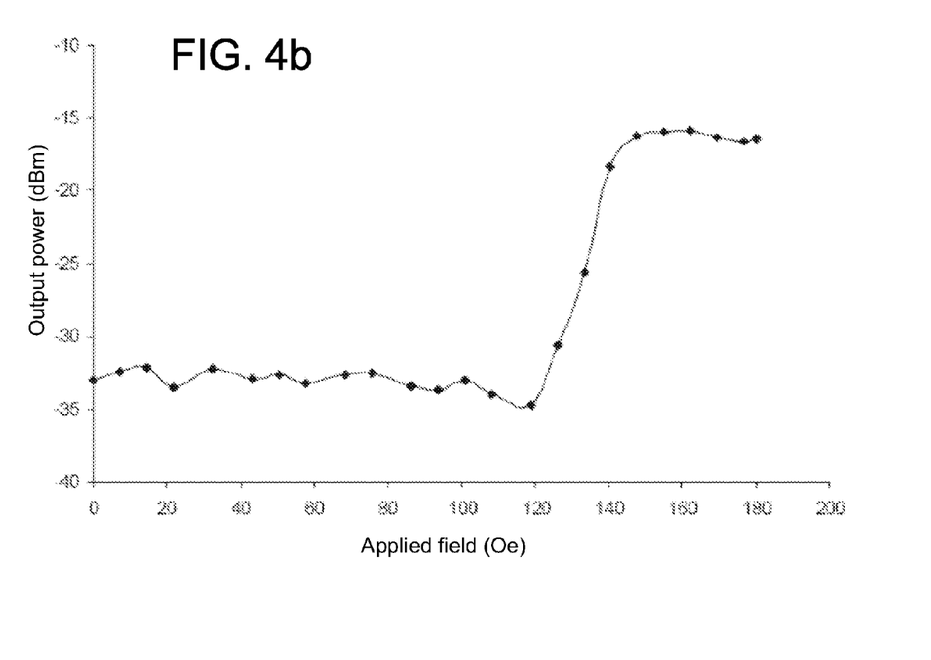
FIG. 4b is a graph of output power versus applied magnetic field undergone by an input beam to the Faraday rotator of FIG. 4.
Figure 4C:
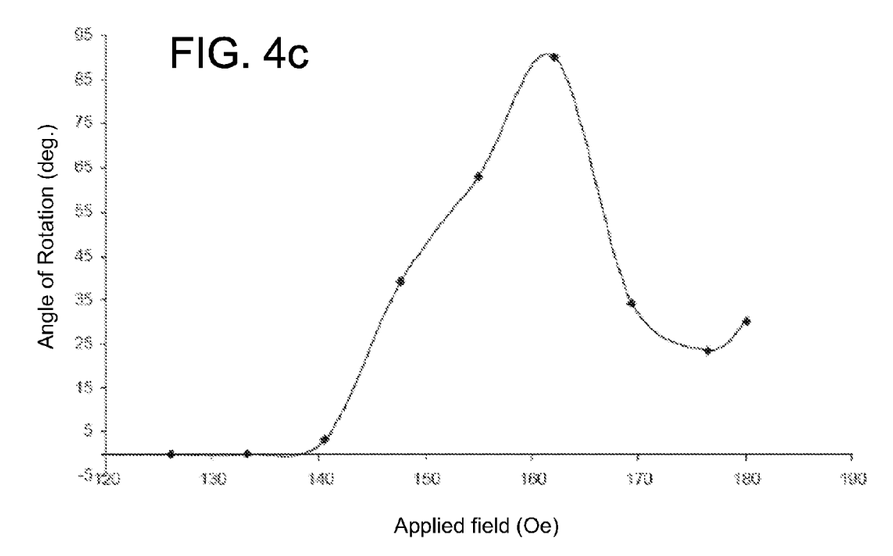
FIG. 4c is a graph of the angle of rotation versus applied magnetic field undergone by an input beam to the Faraday rotator of FIG. 4.

Now that the overall design has been described, the Faraday rotation of a single Faraday rotator was measured as shown in FIG. 4a. Light from an optical transmitter was split into the two orthogonal polarizations by the PBS 10. One of the two outputs was utilized for the measurement of the Faraday rotation. Magneto-optic material placed in the path of the polarized light rotates the plane of polarization of the beam which is intensity modulated with the help of a polarizer according to the following equation, $$P_0 = P_{in} \cos^2 \alpha \quad (10)$$

where α is the angle of polarization of the incoming light with respect to the optical axis of the polarizer. The applied magnetic field was kept less than the saturation magnetic field of 350 Oe. FIGS. 4(b) and 4(c) show the output power and the Faraday rotation undergone by the input beam with varying applied magnetic field.

Turning now to FIGS. 4b and 4c, a Faraday rotation of 90 degrees was observed at a field of about 160 Oe with a drop off in the rotation as the field was further increased. This is due to the fact that a local domain orientation was examined since the beam size was about 62.5 μm (comparable to the core diameter of a multimode fiber). A domain that is anti parallel to the applied field gives an initial rotation of about 45 degrees and will further rotate by 45 degrees when fully saturated giving a total of 90 degree rotation from the initial state. The drop off in the rotation can be explained by the cosine term of Equation 10. Therefore the experimental switch was implemented with only one magneto-optic material instead of two in both paths as shown in FIG. 2. According to the value of the field, i.e. 160 Oe or zero, applied to the sample in path 1, the switch turned off or on respectively. The second magneto-optic material may provide additional tuning capability to the angle of rotation; however, the insertion loss will increase.

Figure 5:
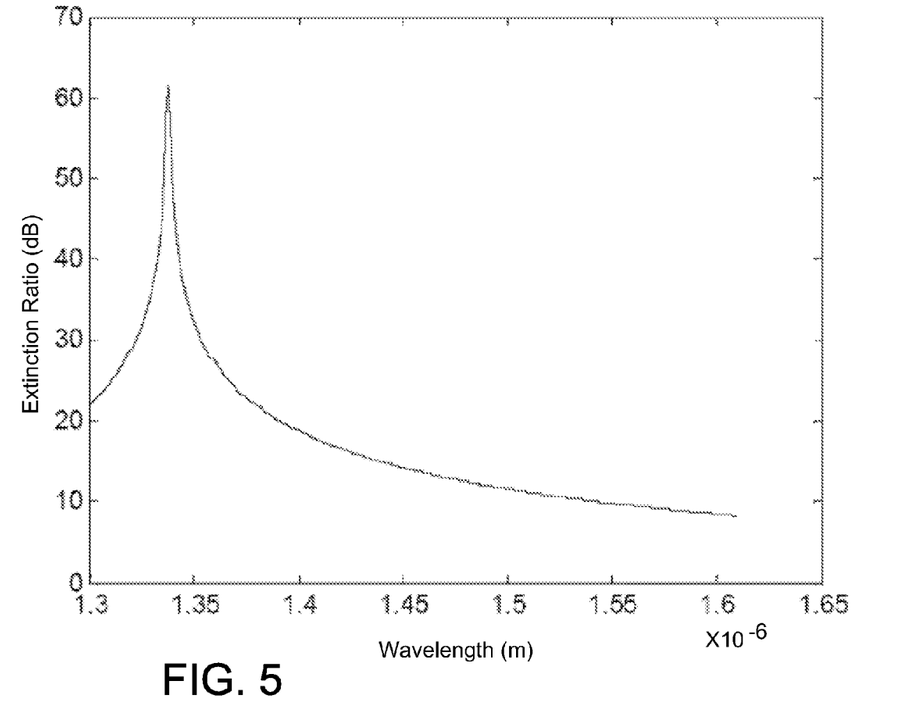
FIG. 5 is a graph of the calculated extinction ratio versus wavelength of the Faraday rotator of FIG. 2.

Turning now to FIG. 5, the extinction ratio is calculated from the above equations. The extinction ratio measured at 1310 nm is about 19 dB. It can be seen that the extinction ratio is a function of the wavelength due to the dispersion of the material.

The switching time of the device is dependent on the magnetization reversal process for the magnetic material Due to finite velocity of domain walls, domain wall motion occurs on a much larger time scale as compared to individual magnetic moment rotation. Consequently, the switching time obtained is much larger. Also the displacement of domain walls is not reversible due to surface defects, impurities, lattice defects, and other phenomena which minimize the associated magneto static energy, thus pinning them to the defect sites. This leads to a fluctuating output power level for different switching cycles. If the domain walls are tightly pinned in their respective positions, the problems can be solved. Cutting grooves in planes parallel to the domain walls is an example of pinning domain walls at surface defects. Introducing surface defects could pin the domain walls at all times.

In this experiment, the stripe domains were involved in the switching. The external magnetic field was applied with the help of a solenoid coil with 1.1 mH inductance and resistance of about 2Ω. With the L/R time constant of 0.55 ms, it takes about three time constants (i.e. 1.65 ms) for the current to reach its maximum value. The switching time of the modulator is thus determined by the inductance of the solenoid coil. The switching time can, however, be improved using a solenoid driver circuit that can rapidly change the current and the flux in the coil and drive a controllable amount of current in the windings and enable as fast as possible current rise and fall times for good high speed performance. A current of 5 amps is required through the solenoid coil for a magnetic field sufficient to turn the switch on. Fast current build-up can be facilitated by using a supply voltage which is several times higher than the nominal voltage applied across the solenoid.

A MC33886 IC. from Motorola was used for the experiment. It is a monolithic H-Bridge ideal for bi-directional thrust solenoid control. Internal control logic, charge pump, gate drive and low RDS (ON) MOSFET output circuitry is integrated in the chip. The MC33886 is able to control continuous inductive DC load currents up to 5.0 A with the capability of pulse width modulation of output loads up to 10 kHz. Two independent inputs control the two outputs.

Figure 6:
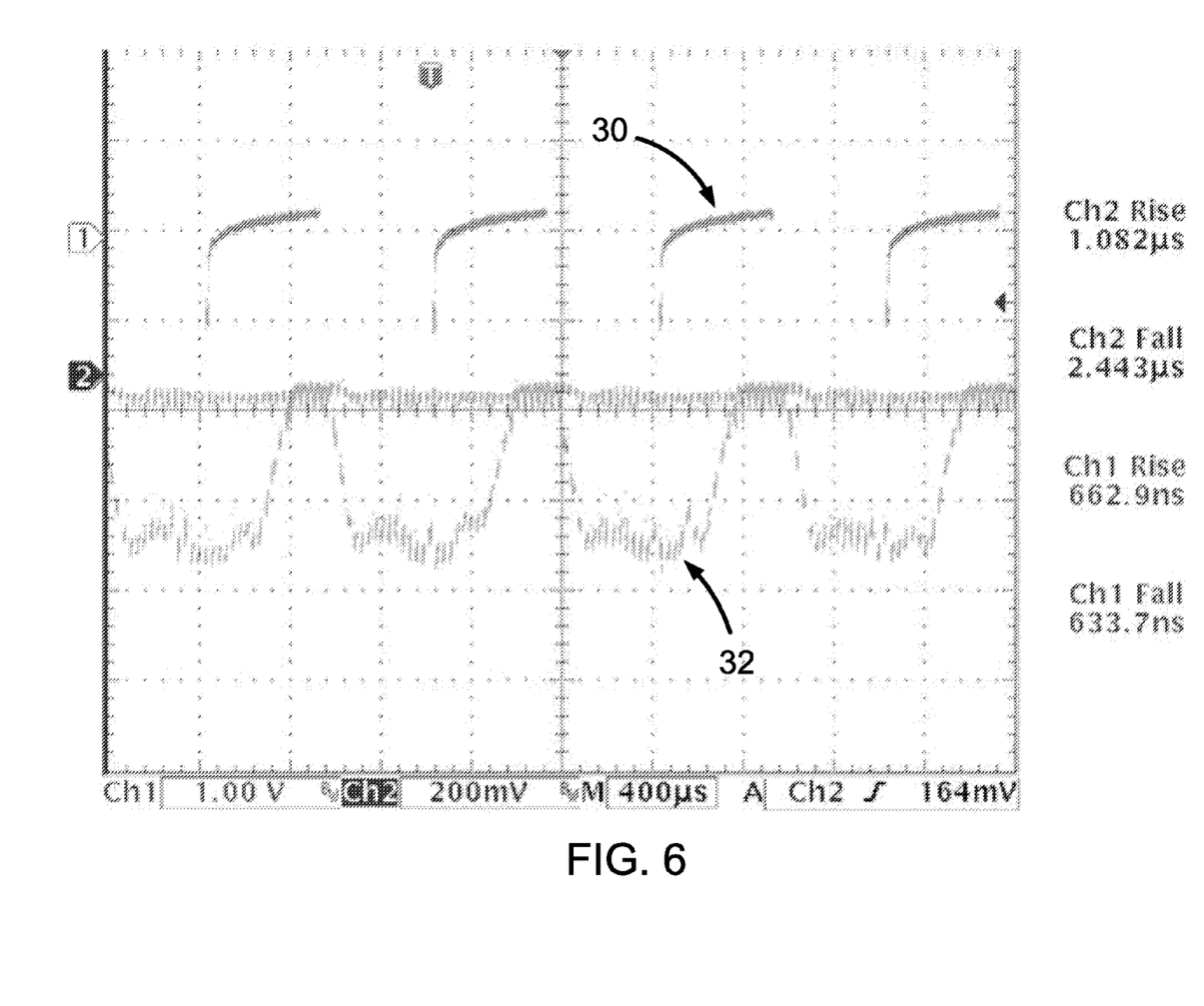
FIG. 6 is a graph of the switching time of the Faraday rotator going from a light transmission state to a light blocking state.

Turning now to FIG. 6, the rise and fall times of about 2 μs shown indicates how fast the switch goes from a light transmission to a light blocking state. In FIG. 6, the measured external applied voltage is labeled with reference number 30 and the switching of the optical signal is labeled with reference number 32. The dynamics of switching are related to the dynamics of the domain wall motion in the magneto-optic material. A magneto-optic material with a higher velocity of domain walls such as yttrium orthoferrite will likely result in a better switching time.

One type of magneto-optic switch that can be implemented as an all fiber switch is a Mach-Zehnder type optical switch utilizing Faraday rotation. In the description that follows, the switch will be implemented with Faraday rotation exhibited by bismuth substituted iron garnet (($Bi_{1.1}Tb_{1.9}$)($Fe_{4.25}Ga_{0.75}$)$O_{12}$) samples, 500 um thick. The switch is an all-fiber device where light does not exit from the fiber except when propagating through the magneto-optic Faraday rotator (MOFR). Simple construction and operation of Mach-Zehnder interferometer (MZI) based optical devices make them suitable for photonic integrated circuits (PICs). Thus the interferometric configuration paves the way for fabrication of integrated magneto-optical devices that are low cost, better performing and compatible with all-fiber optical communications networks.

Figures 7, 8:
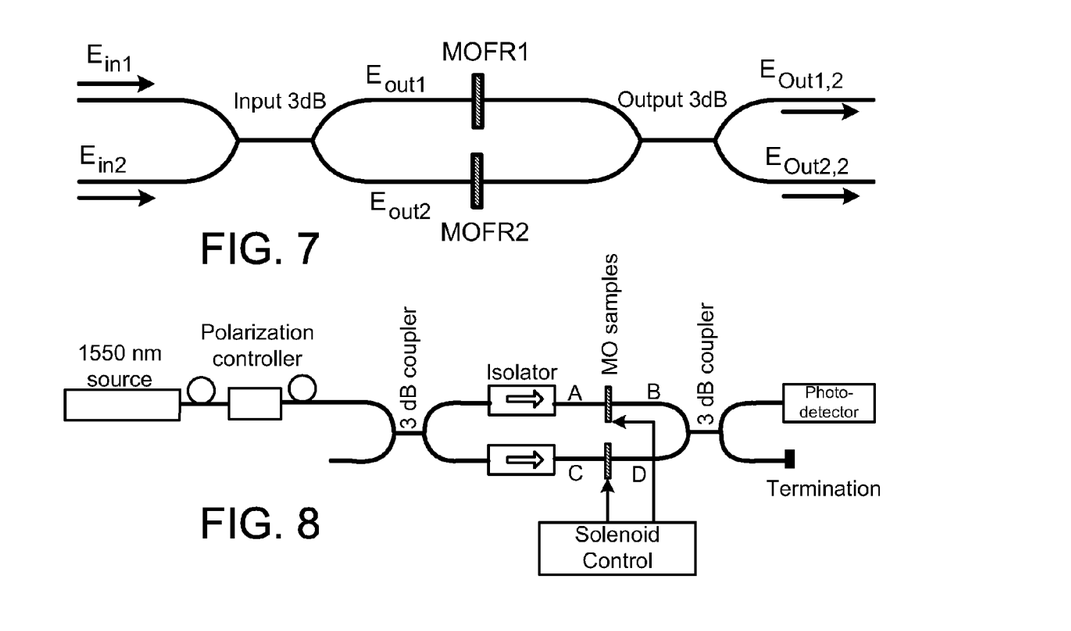
FIG. 7 is a schematic of a Mach-Zehnder interferometric switch utilizing Faraday rotation.
FIG. 8 is a schematic of a setup of an all fiber Mach-Zehnder interferometric switch based on Faraday rotation.

The switch construction is similar to the MZI shown in FIG. 7. The input 3 dB coupler splits the incoming signal equally at the output ports. MOFR samples are placed in each path and the path length difference of the interferometer arms is zero. The signals are then combined by an output 3 dB coupler at the output. The phase shift required for the interferometric operation is obtained by rotation of polarization of the optical signal incident on the MOFR samples. Using simple matrix analysis the switching operation can be modeled as follows. The signal at the output ports of a 3 dB coupler is given as, $$\begin{pmatrix} \vec{E}_{out1} \\ \vec{E}_{out2} \end{pmatrix} = \frac{1}{\sqrt{2}} \begin{pmatrix} 1 & j \\ j & 1 \end{pmatrix} \begin{pmatrix} \vec{E}_{in1} \\ \vec{E}_{in2} \end{pmatrix} \qquad (11)$$

where $\vec{E}_{in1}$ and $\vec{E}_{in2}$ are the input signals at the respective input ports of the coupler and $\vec{E}_{out1}$ and $\vec{E}_{out2}$ are the output signals at the respective output ports of the coupler.

The components of a signal transmitted through a MOFR can be written with the help of Jones matrices as, $$\begin{pmatrix} E_x \\ E_y \end{pmatrix} = \begin{pmatrix} \cos\kappa & -\sin\kappa \\ \sin\kappa & \cos\kappa \end{pmatrix} \qquad (12)$$

where κ is the angle of rotation of the state of polarization (SOP) of the input signal. Let us consider a linearly polarized signal that can generally be written as follows, $$\vec{E}_{in} = \vec{E}_{in1} = \hat{x}E_{ox}\cos\phi + \hat{y}E_{oy}\cos \qquad (13)$$

where φ is the phase angle. For simplicity and without loss of generality, φ=0 and $E_{oy}$=0 can be assumed, with the second input $E_{in2}$=0. The output of the output 3 dB coupler is obtained by matrix multiplication of the individual components of the interferometric setup and is given by, $$\begin{pmatrix} \vec{E}_{out1,2} \\ \vec{E}_{out2,2} \end{pmatrix} = \begin{pmatrix} \frac{e^{-j\beta}}{2}E_{ox}[\hat{x}(\cos\theta - \cos\alpha) + \hat{y}(\sin\theta - \sin\alpha)] \\ j\frac{e^{-j\beta}}{2}E_{ox}[\hat{x}(\cos\theta - \cos\alpha) + \hat{y}(\sin\theta - \sin\alpha)] \end{pmatrix} \qquad (14)$$

where θ and α are the Faraday rotation angles of MOFR1 and MOFR2 respectively. The values of the output fields are given in table from which one can see the transfer of the optical signal from one output port to another depending on the values of the angles. $P_{out1,2}$ and $P_{out2,2}$ denote the corresponding optical powers.

TABLE I

| | Interferometric output | |
|---|---|---|
| | θ = α = 0 | θ = α = −90° |
| $\vec{E}_{out1,2}$ | 0 | $e^{+j\gamma}E_{ox}\hat{y}$ |
| $\vec{E}_{out2,2}$ | $je^{+j\gamma}E_{ox}\hat{x}$, ON | 0, OFF |
| $P_{out1,2}$ | 0 | $E_{ox}^2$ |
| $P_{out2,2}$ | $E_{ox}^2$ | 0 |

For a 1×1 switch, port 2 can be chosen as the output port as the SOP of the original input signal remains the same. There is however a 90° phase shift as expected.

Figure 9:
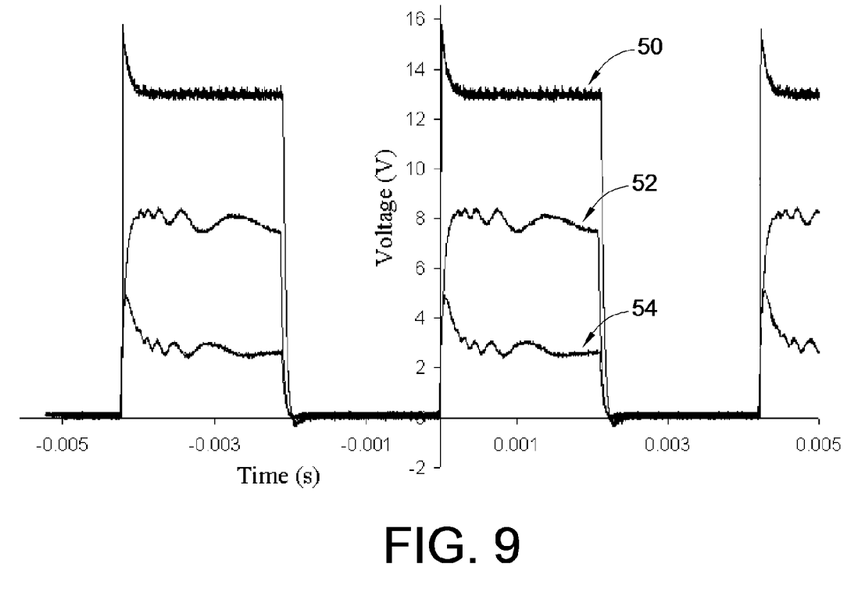
FIG. 9 is a graph of an input signal overlaid on an output signal at 0 Oe and 200 Oe for the switch of FIG. 8 using single mode fibers.
Figure 10:
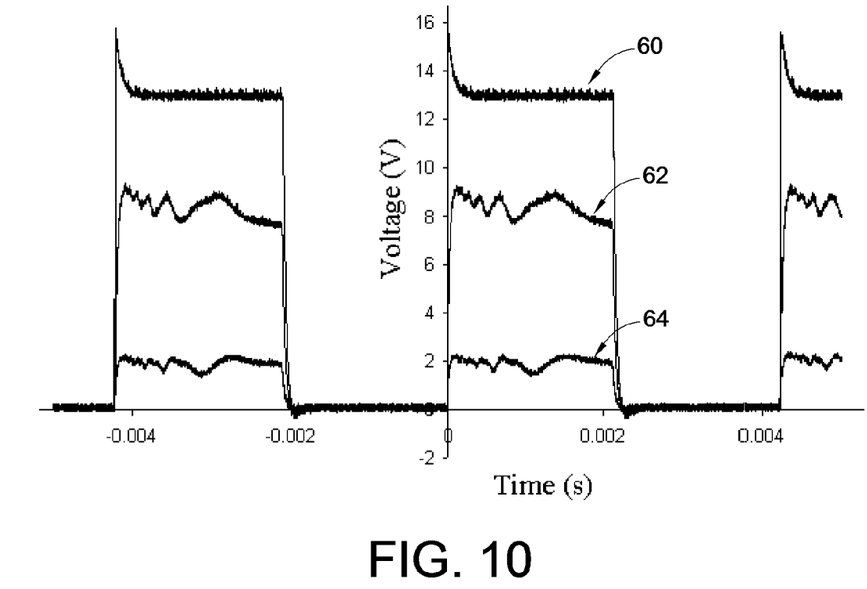
FIG. 10 is a graph of an input signal overlaid on an output signal at 0 Oe and 200 Oe for the switch of FIG. 8 using multimode fibers

Now that the all-fiber Mach-Zehnder interferometric switch has been describe, experimental test results shall now be described. The experimental setup of the switch is shown in FIG. 8. In FIG. 8, the input from a 1550 nm laser is linearly polarized with the help of a polarization controller (PC). The MOFRs are actuated with the help of current carrying solenoids that provide the bias magnetic field. The input laser was modulated at 235 Hz. Other modulation frequencies can be used. The optical length of the two paths was made equal by employing the same length of fiber and the same thickness of MOFRs in both the paths. Isolators were used to reduce back reflections in the setup. For proof of principle, an external magnetic field was applied across MOFR1 and the field across MOFR2 remained zero. The output optical power was detected with the help of a photodetector. The generated photocurrent was converted to voltage across a load resistor. This voltage was monitored by an oscilloscope. The experiment was carried out for both single mode (SMF) and multimode (MMF) fibers. In the case of MMFs only fibers A, B, C and D (see FIG. 8) were MMFs. The measured optical intensity is shown in FIGS. 9 (SMF fibers) and 10 (MMF fibers) respectively. In FIG. 9, signal 50 is the input signal, signal 52 is the output signal with the switch on at 0 Oe, and signal 54 is the output signal with the switch off at 200 Oe. In FIG. 10, signal 60 is the input signal, signal 62 is the output signal with the switch on at 0 Oe, and signal 64 is the output signal with the switch off at 200 Oe.

Typically Faraday rotation for ferromagnetic materials can be treated as linear with applied field $H_{app}$ up to its saturation field $H_{sat}$. In the linear region the Faraday rotation is θ=θsat ($H_{app}/H_{sat}$) where $H_{sat}$ is the rotation at saturation. This relationship is true when the diameter of the optical beam incident on the surface of the material is large enough to sample a large number of domains in order to average out the effects of the contributions by individual domains. For smaller beam sizes this relationship does not hold and individual contributions play an important role in the determination of the Faraday rotation. The domain size of the ferromagnetic samples used was measured to be about 20 μm. Thus a MMF with a beam size of about 62.5 μm will see a larger number of domains compared to that seen by a SMF that has a beam diameter of about 10 μm. This results in a different value for Faraday rotation for a MMF as compared to that obtained for a SMF. For the same value of the external applied field the output was attenuated more for MMFs.

The interferometric output was measured by varying the external magnetic field across MOFR1 from zero to 200 Oe. The output signal was clearly attenuated with the application of the magnetic field. The measured extinction ratio for the ON/OFF operation of the switch was about 8.5 dB for SMFs and about 12.5 dB for MMFs. For a better extinction ratio, a reverse magnetic field across MOFR2 can be applied and the bias field across both rotators can be simultaneously controlled as predicted by the theoretical analysis.

Figure 11:
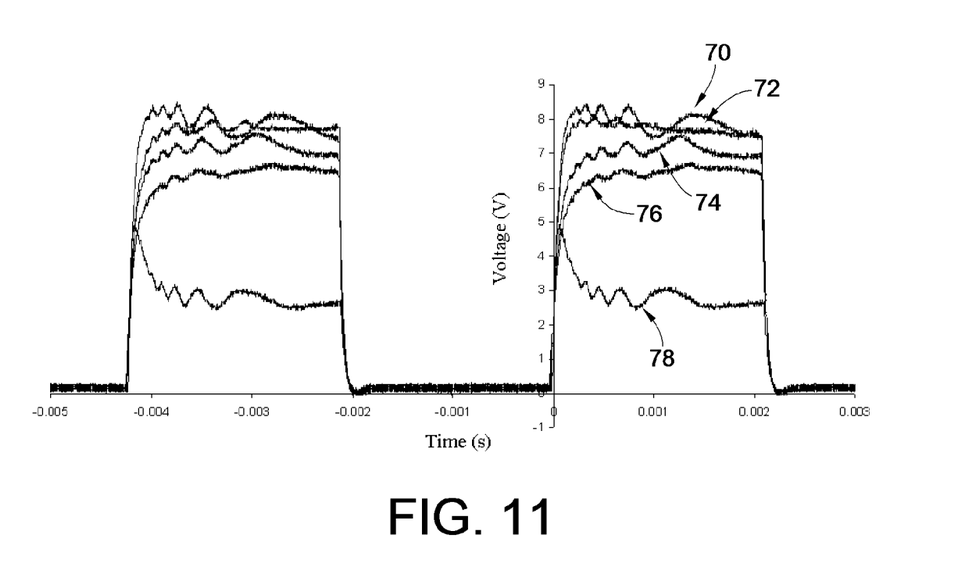
FIG. 11 is a graph of the measured output field of the switch of FIG. 9 with varying magnetic field ranging from 0 Oe to 200 Oe.

It is well known that Faraday rotation depends on the value of the external bias magnetic field below $H_{sat}$. The magnetic field was varied and the output signal was measured as shown in FIG. 11, for SMFs. Signal 70 is the measured output field at 0 Oe, signal 72 is the measured output field at 50 Oe, signal 74 is the measured output field at 100 Oe, signal 76 is the measured output field at 150 Oe, and signal 78 is the measured output field at 200 Oe.

The signal was attenuated more with increasing magnetic field and would saturate for a field value close to the saturation field of 350 Oe. Thus the experiments show that switching is achieved well below the saturation field and therefore hysteresis can be effectively avoided.

The insertion loss of the device was measured to be about 4.2 dB and includes Fresnel reflection loss from the fiber/MO interface as well as the loss due to individual components and fiber connectors.

The switching time of the device depends on the switching of the magnetic domains in the magnetic material. The two main mechanisms for switching are rotation of individual magnetic moments and motion of domain walls. Due to the finite velocity of domain walls, domain wall motion occurs on a much larger time scale as compared to individual magnetic moment rotation. Consequently the switching time obtained is much larger. For faster switching the domain wall motion may be restricted by pinning the walls to artificially introduced defects such as grooves in planes parallel to the domain walls. In this case the switching time obtained can be in the order of nanoseconds. This however worsens the optical loss due to the poor surface quality of the MOFR.

The switching time for the unpinned domains walls was measured to be about 2 μs. The measured time was limited by the external circuit that provided the bias magnetic field. There is a time constant associated with the inductance of the current coil which is generally greater than the switching time limit determined by the domain dynamics. For a rapid di/dt, a large voltage capacity is needed in the solenoid drive circuit. This was achieved by connecting four individual H-bridge ICs capable of controlling DC currents up to 5 A with pulse width modulation up to 10 kHz. The external field across the MOFRs can be treated as homogeneous as the dimensions of the solenoid (diameter=2 cm, length=6.5 cm) were much greater than those of the MOFRs.

From the foregoing, it can be seen that an all-fiber magneto-optic switch based on the magneto-optic effect of magnetic materials has been designed and demonstrated with promising performance and compatibility with fiber networks. The effect of beam size on Faraday rotation has also been demonstrated. The switching time of the device can be much less, on the order of a few nanoseconds, which is desirable for bit level switching in fiber communications networks.

It is desirable to have an efficient, practical, and deployable design with low insertion loss and a highly effective rotation and at the same time ensuring that the interferometer produces precise phase control. Having fibers, connecters and their supporting structures create many small parametric variables that are hard to overcome. A better solution is an integration of the design on a Si chip where we use the integration process to define the path in a more exact way. An integrated solution shows the full capability, is efficient, deployable, and is capable of mass production for the magneto-optic interferometer.

Figure 12A:
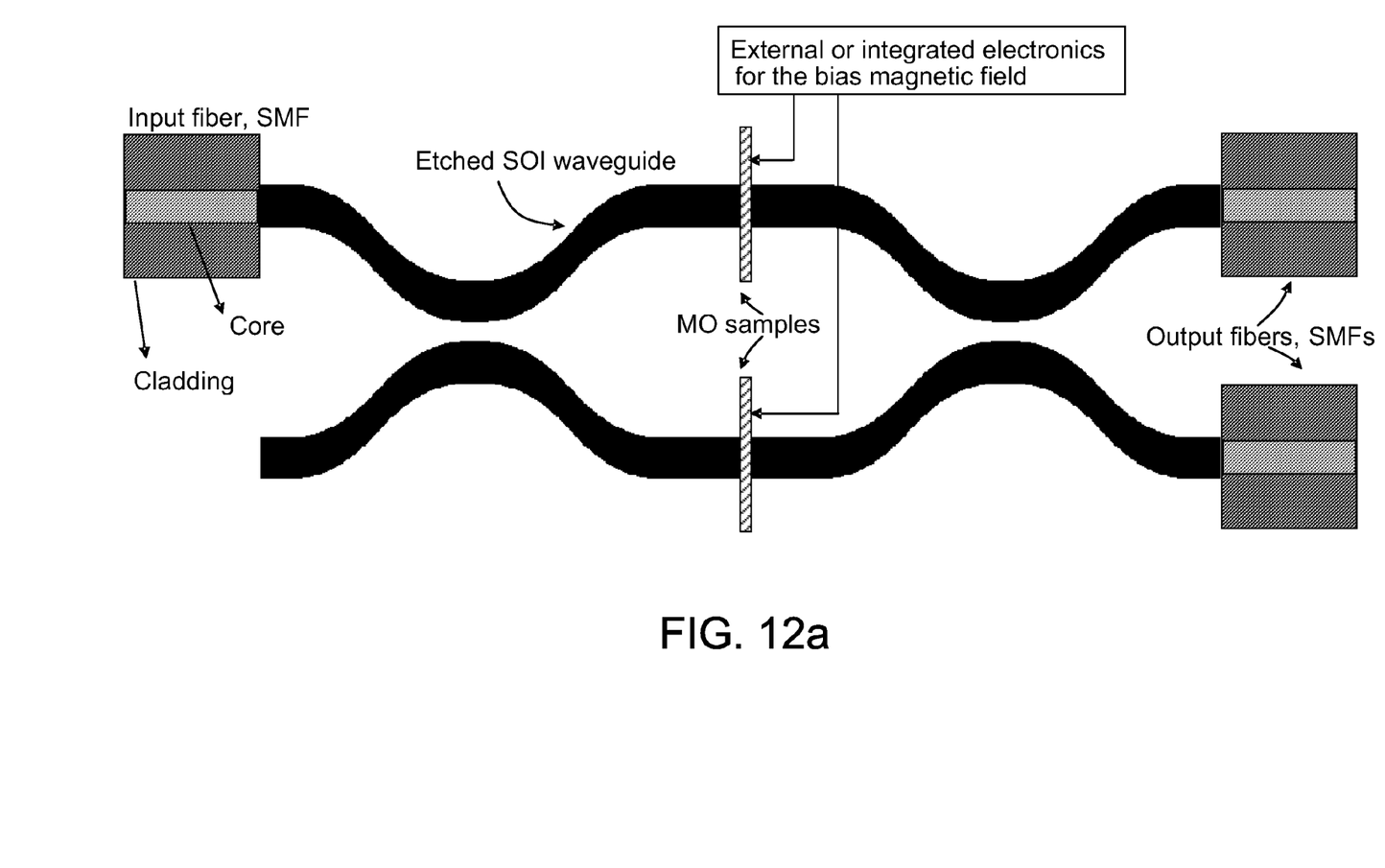
FIG. 12a is a schematic of the top view of an integrated switch on silicon-on-insulator (SOI) wafer.
Figure 12B:
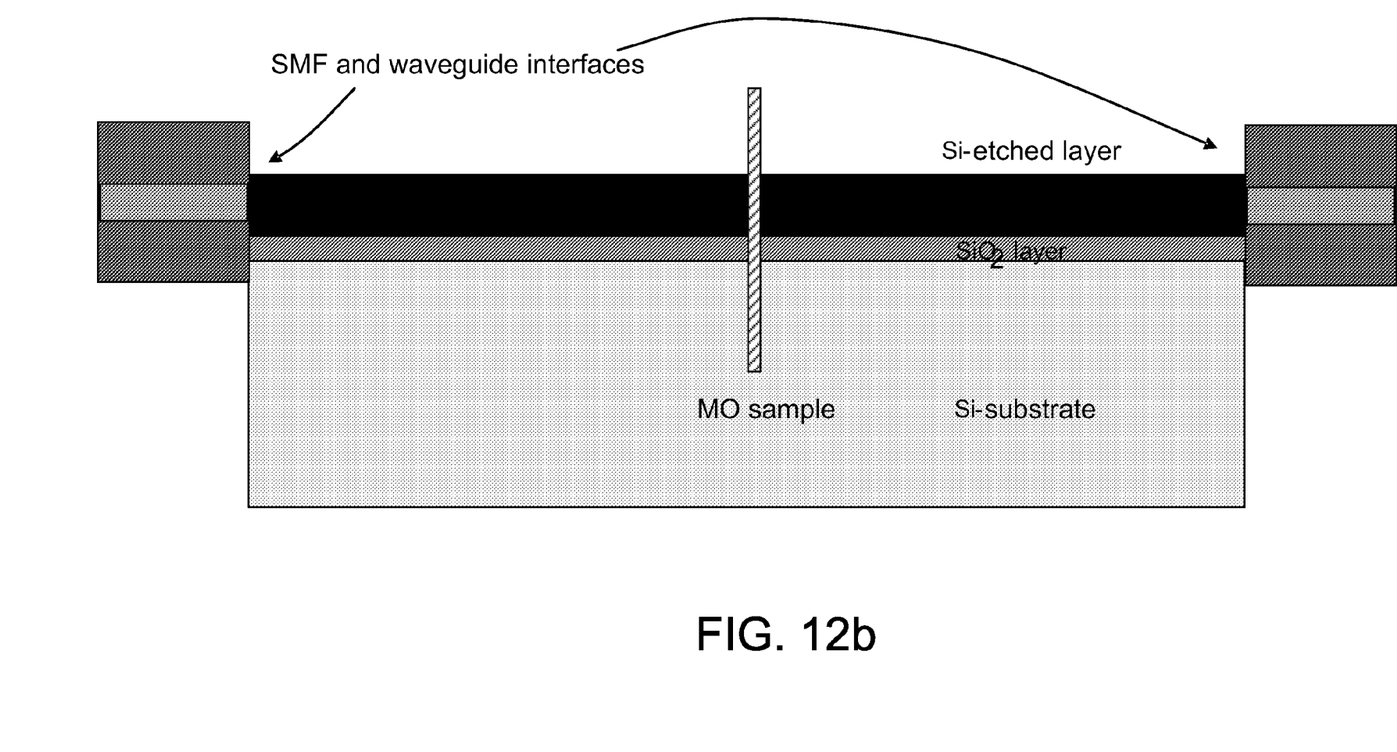
FIG. 12b is a schematic of the side view of the integrated switch.

The top view of an embodiment of an integrated Mach-Zehnder interferometric switch schematic is shown in FIG. 12a. The wafer is silicon-on-insulator of which the top Si layer is etched to fabricate the interferometeric structure. The grooves for the magneto-optic Faraday rotators are made by Deep-Reactive Ion Etching. An external magnetic field is applied to the Faraday rotators to change the state of polarization of the optical signal incident on them. This scheme also includes the fiber-waveguide interfaces as shown in FIG. 12b.

With the reduction in the size of the device, the external switching circuit for the bias field can be made faster. Further increases in switching speeds can be made with faster switching electronics for the bias field. The location of the beam spot on the surface of the magnetic material is important in order to achieve rotation of polarization of the optical signal by the desired amount. The switch can be designed in an interferometric as well as non interferometric configuration. More complex versions of switches and attenuators can be made from different combinations of these devices.

What is claimed is:

1. An all-fiber magneto-optic switch having an input and an output, the all-fiber magneto-optic switch comprising:
    a polarization beam splitter for splitting at least one incoming signal into a first and a second orthogonal polarized paths;
    at least one magneto-optic Faraday rotator in each path;
    a polarization beam counter to couple the orthogonal polarized paths at the output; and
    first means for producing a first field in only the first path to control the polarization of each of the at least one magneto-optic Faraday rotator in only the first path, whereby presence of the field changes the state of the all-fiber magneto-optic switch; and
    wherein the means for producing the first field comprises a current carrying coil wound about the at least one magneto-optic Faraday rotator in the first path.

2. The all-fiber magneto-optic switch of claim 1 wherein the presence of the field changes the state to an off state.

3. The all-fiber magneto-optic switch of claim 1 wherein the reversal of the field changes the state to an on state.

4. The all-fiber magneto-optic switch of claim 1 wherein the presence of the field changes the state to an on state.

5. The alt-fiber magneto-optic switch of claim 1 wherein the reversal of the field changes the state to an off state.

6. The all-fiber magneto-optic switch of claim 1 wherein the at least one magneto-optic Faraday rotator in each path comprises a bismuth substituted iron garnet.

7. The all-fiber magneto-optic switch of claim 1 wherein the at least one magneto-optic Faraday rotator has at least one surface defect.

8. An all-fiber magneto-optic switch having an input and an output, the all-fiber magneto-optic switch comprising:

a polarization beam splitter for splitting at least one incoming signal into a first and a second orthogonal polarized paths;

at least one magneto-optic Faraday rotator in each path;

a polarization beam coupler to couple the orthogonal polarized paths at the output; and first means for producing a first field in only the first path to control the polarization of each of the at least one magneto-optic Faraday rotator in only the first path, whereby presence of the field chances the state of the all-fiber magneto-optic switch; and wherein light does not exit from the all-fiber magneto-optic switch when at least one magneto-optic Faraday rotator is energized.

9. The all-fiber magneto-optic switch of claim 8 further comprising an isolator in each path.

10. The all-fiber magneto-optic switch of claim 8 wherein the orthogonal polarized paths have equal lengths.

11. An all-fiber Mach-Zehnder interferometric switch comprising:

an input 3 dB coupler that splits an incoming signal into a first and a second orthogonal polarized paths;

at least one magneto-optic Faraday rotator in each path;

an output 3 dB coupler to couple the first and the second orthogonal polarized paths at an output; and first means for producing a first field in only the first path to control the polarization of each of the at least one magneto-optic Faraday rotator in only the first path, whereby presence of the field changes the state of the all-fiber Mach-Zehnder interferometric switch; and wherein a phase shift required for the interferometric operation is obtained by rotation of polarization of an optical signal incident on the at least one magneto-optic Faraday rotator.

12. The all-fiber Mach-Zehnder interferometric switch of claim 11 wherein the at least one magneto-optic Faraday rotator has at least one surface defect.

13. The all-fiber Mach-Zehnder interferometric switch of claim 11 further comprising an isolator in each path.

14. A silicon-on-insulator integrated Mach-Zehnder interferometric switch comprising:

a 3 dB integrated waveguide coupler at the input;

at least one magneto-optic Faraday rotator in each of a first and a second waveguide path;

a 3 dB integrated waveguide coupler at the output; and at least one integrated or separate assembly to provide magnetic biasing for at least one magneto-optic Faraday rotator in only the first waveguide path.

15. The silicon-on-insulator integrated Mach-Zehnder interferometric switch of claim 14 wherein a phase shift required for the interferometric operation is obtained by rotation of polarization of an optical signal incident on at least one magneto-optic Faraday rotator.

16. The silicon-on-insulator integrated Mach-Zehnder interferometric switch of claim 14 wherein the at least one magneto-optic Faraday rotator has at least one surface defect.

17. The silicon-on-insulator integrated Mach-Zehnder interferometric switch of claim 14, further comprising a second integrated or separate assembly to provide magnetic biasing opposite to the magnetic biasing provided for the at least one magneto-optic Faraday rotator in only the first waveguide path for at least one magneto-optic Faraday rotator in only the second waveguide path.

18. An all-fiber magneto-optic switch having an input and an output, the all-fiber magneto-optic switch comprising:

a polarization beam splitter for splitting at least one incoming signal into a first and a second orthogonal polarized paths;

at least one magneto-optic Faraday rotator in each path;

a polarization beam coupler to couple the orthogonal polarized paths at the output;

first means for producing a first field in only the first path to control the polarization of each of the at least one magneto-optic Faraday rotator in only the first path, whereby presence of the field changes the state of the all-fiber magneto-optic switch; and second means for producing a second field in only the second path to control the polarization of each of the at least one magneto-optic Faraday rotator in only the second path, the second field being opposite to the first field produced by the first means.

19. An all-fiber Mach-Zehnder interferometric switch comprising:

an input 3 dB coupler that slits an incoming signal into a first and a second orthogonal polarized paths;

at least one magneto-optic Faraday rotator in each path;

an output 3 dB coupler to couple the first and the second orthogonal polarized paths at an output;

first means for producing a first field in only the first path to control the polarization of each of the at least one magneto-optic Faraday rotator in only the first path, whereby presence of the field changes the state of the all-fiber Mach-Zehnder interferometric switch; and second means for producing a second field in only the second path to control the polarization of each of the at least one magneto-optic Faraday rotator in only the second path, the second field being opposite to the first field produced by the first means.

* * * * *